United States Patent [19]

Abe et al.

[11] Patent Number: 4,846,555

[45] Date of Patent: Jul. 11, 1989

[54] SYSTEM FOR IMPROVING VISIBILITY OF OBJECTS WITHIN VISUAL FIELD

[75] Inventors: Yuuichi Abe, Yokosuka; Yasutoshi Seko; Hiroshi Tsuda, both of Yokohama, all of Japan

[73] Assignee: Nissan Motor Company, Limited, Japan

[21] Appl. No.: 753,054

[22] Filed: Jul. 9, 1985

[30] Foreign Application Priority Data

Jul. 9, 1984 [JP] Japan .................................. 59-141900

[51] Int. Cl.⁴ .......................... G02B 27/00; G02B 5/22
[52] U.S. Cl. .................................. 350/276 R; 350/316; 350/399
[58] Field of Search ..................... 350/276 R, 320, 399, 350/404, 358, 166, 316; 362/231

[56] References Cited

U.S. PATENT DOCUMENTS

| | | | |
|---|---|---|---|
| 1,786,518 | 12/1930 | Chambers | 350/316 |
| 1,844,840 | 2/1932 | Chubb | 350/316 |
| 2,087,795 | 7/1937 | Chubb | 350/399 |
| 2,960,914 | 11/1960 | Rogers | 350/404 |
| 3,475,080 | 10/1969 | Shumway | 350/276 R |

FOREIGN PATENT DOCUMENTS 49-72830  7/1974  Japan .
50-138526 11/1975  Japan .
52-101526  8/1977  Japan .

*Primary Examiner*—Bruce Y. Arnold
*Assistant Examiner*—Loha Ben
*Attorney, Agent, or Firm*—Lowe, Price, LeBlanc, Becker & Shur

[57] ABSTRACT

Disclosed are a system and a method for improving the visibility of objects within the visual field of a vehicular driver while driving under optically adverse conditions. The system includes an optical filter with a pass band in the visible light range disposed in front of the eyes of the driver, and a light transmitter sending out a beam of visible light with frequency components within the pass band toward the object. In addition, this system protects the driver from being dazzled by light from an approaching vehicle in the opposite lane. The method includes the steps of allowing transmission of visible light with a first frequency component to the driver and transmitting visible light with a second frequency component into the visual field, the second frequency component being a subset of the first frequency component.

11 Claims, 4 Drawing Sheets

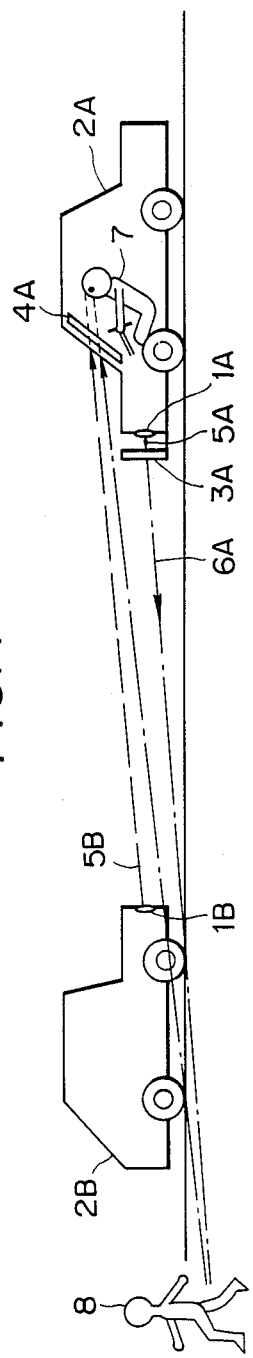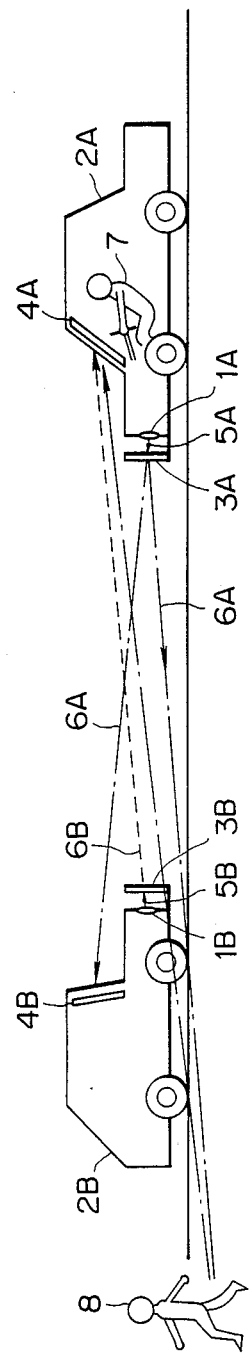

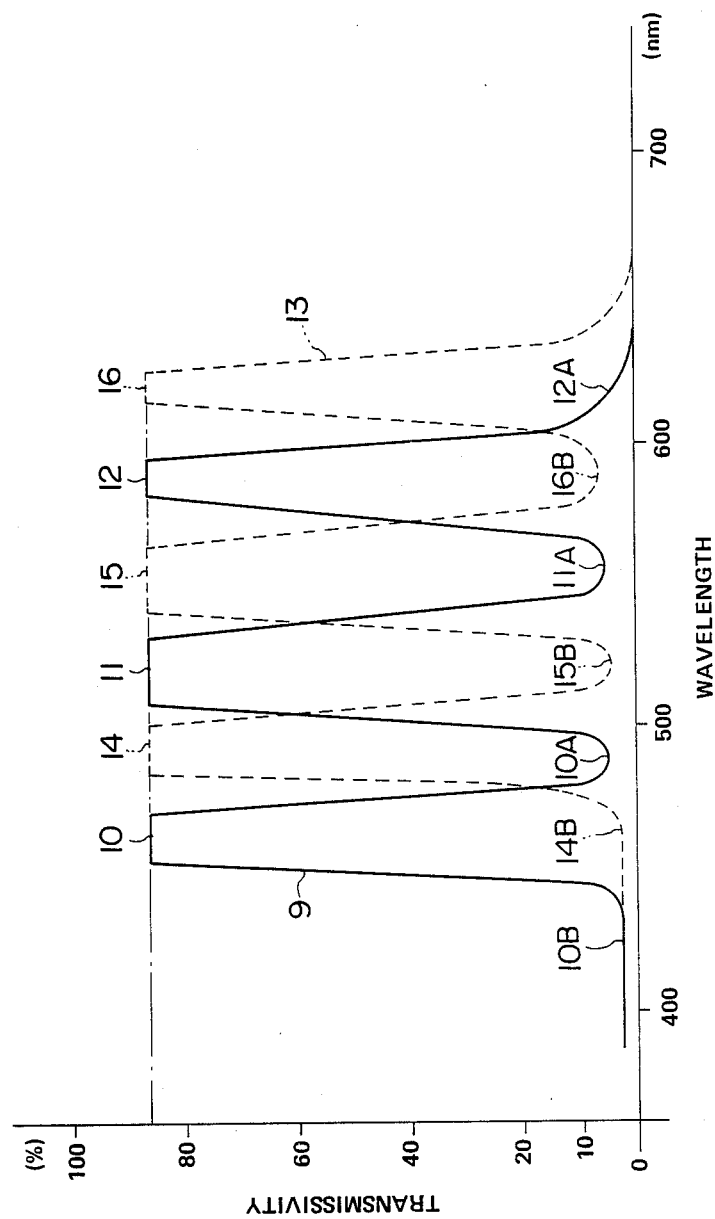

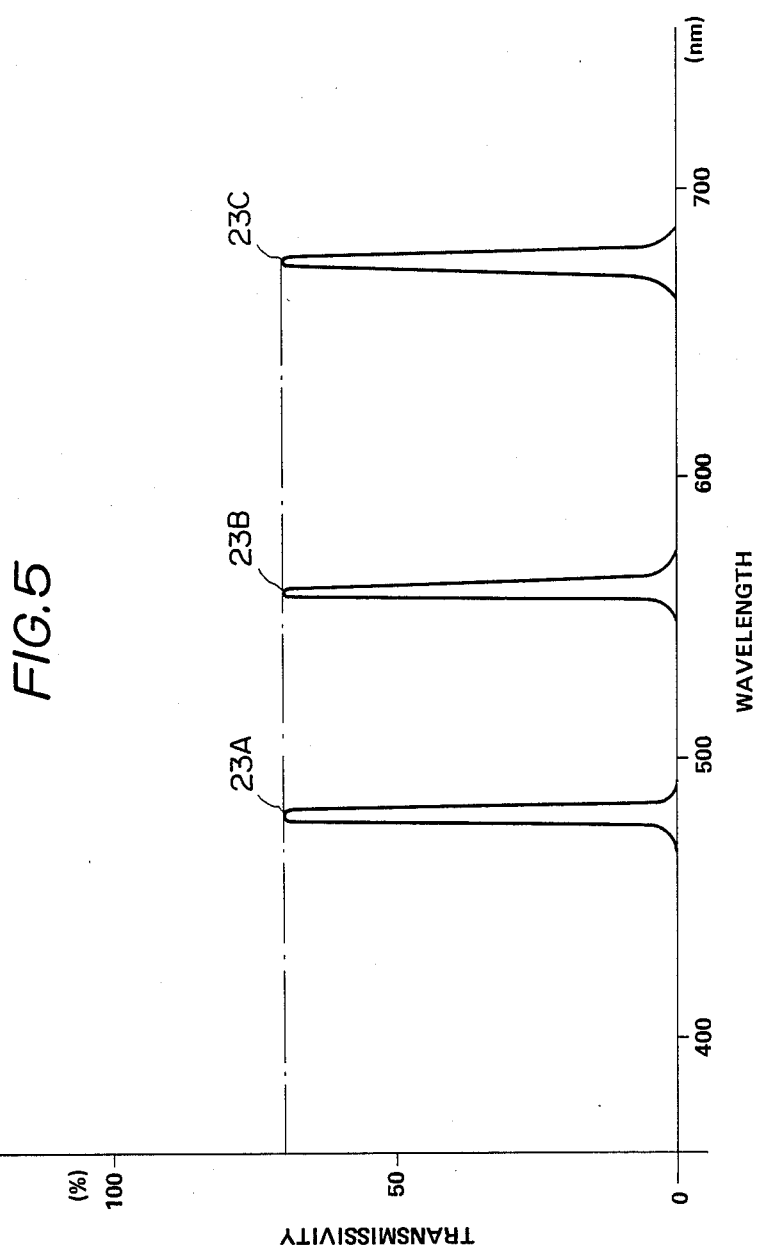

SYSTEM FOR IMPROVING VISIBILITY OF OBJECTS WITHIN VISUAL FIELD

BACKGROUND OF THE INVENTION

1. Field of the Invention

This invention relates to a system and method for improving the visibility of objects within a visual field and in particular to a system and method for use in an automotive vehicle under adverse optical conditions.

2. Description of the Prior Art

Generally, safety requires that the driver of an automotive vehicle be protected from being dazzled by the headlights cast by an automotive vehicle in the opposite lane.

Japanese published unexamined patent application No. 52-101526 discloses a prior art system for shutting out the headlights cast by an automotive vehicle in the opposite lane. This system employs a pair of polarizing filters. One filter can pass only the horizontally- or vertically-vibrating component of the headlight beam and is placed in front of the headlights of an automotive vehicle. The other filter can conversely pass only the vertically- or horizontally-vibrating component of the headlight beam and is placed on the windshield of the automotive vehicle. However, this system is less effective in cases where the vehicle in the opposite land lacks the same polarizing filters as are used on one's own vehicle.

Japanese published unexamined patent application No. 49-72830 or 50-138526 also discloses a system for suppressing transmission of headlights cast by an automotive vehicle in the opposite lane through a vehicular windshield by means of a liquid crystal panel and an electronic circuit for controlling the transmissivity of the liquid crystal panel. However, since this system darkens the entire forward visual field of the vehicle on which the headlights are incident, at the moment the liquid crystal filter transmissivity is reduced the driver of the filtering vehicle may fail to recognize irregularities, obstacles and/or pedestrians crossing or standing in the road within the forward visual field.

SUMMARY OF THE INVENTION

An object of this invention is to provide a system for improving the visibility of objects within the visual field of, e.g. a vehicular driver, during night driving. In order to achieve this object, an optical filter with a predetermined pass band in the visible light range is disposed in front of the eyes of a driver as he sits in the vehicle and a light transmitter, e.g. headlight transmitter transmitting visible light, with frequency components falling within the above pass band, is directed toward objects within the visual field of the driver.

The inventive system can increase the visibility of objects within the visual field illuminated by the light from one's own vehicle even when the light from a vehicle in the opposite lane strikes the eyes of the driver of one's own vehicle under optically adverse conditions, e.g. at night.

In addition, the inventive system protects the driver of one's own vehicle from being dazzled by the light from a vehicle in the opposite lane by means of the optical filter.

Another object of this invention is to provide a method for improving the visibility of objects within the visual field of the driver of a vehicle. In order to achieve this object, this method comprises the steps of optically filtering a first frequency component from visible light directed toward the driver and transmitting visible light with a second frequency component toward objects, the second frequency component falling within the first frequency component.

BRIEF DESCRIPTION OF THE DRAWINGS

FIG. 1 is a diagram of a system for improving the visibility of objects within a visual field, applied to an automotive vehicle, according to one embodiment of this invention.

FIG. 2 is a graph of the spectral transmissivity properties of an output filter and an input filter.

FIG. 3 is a diagram of a system for improving the visibility of objects within a visual field, applied to one's own automotive vehicle and an automotive vehicle in the opposite lane, according to another embodiment of this invention.

FIG. 5 is a graph of the spectral transmissivity properties of three monochromatic light filters shown in FIG. 4.

DESCRIPTION OF THE PREFERRED EMBODIMENTS

Figure 4:
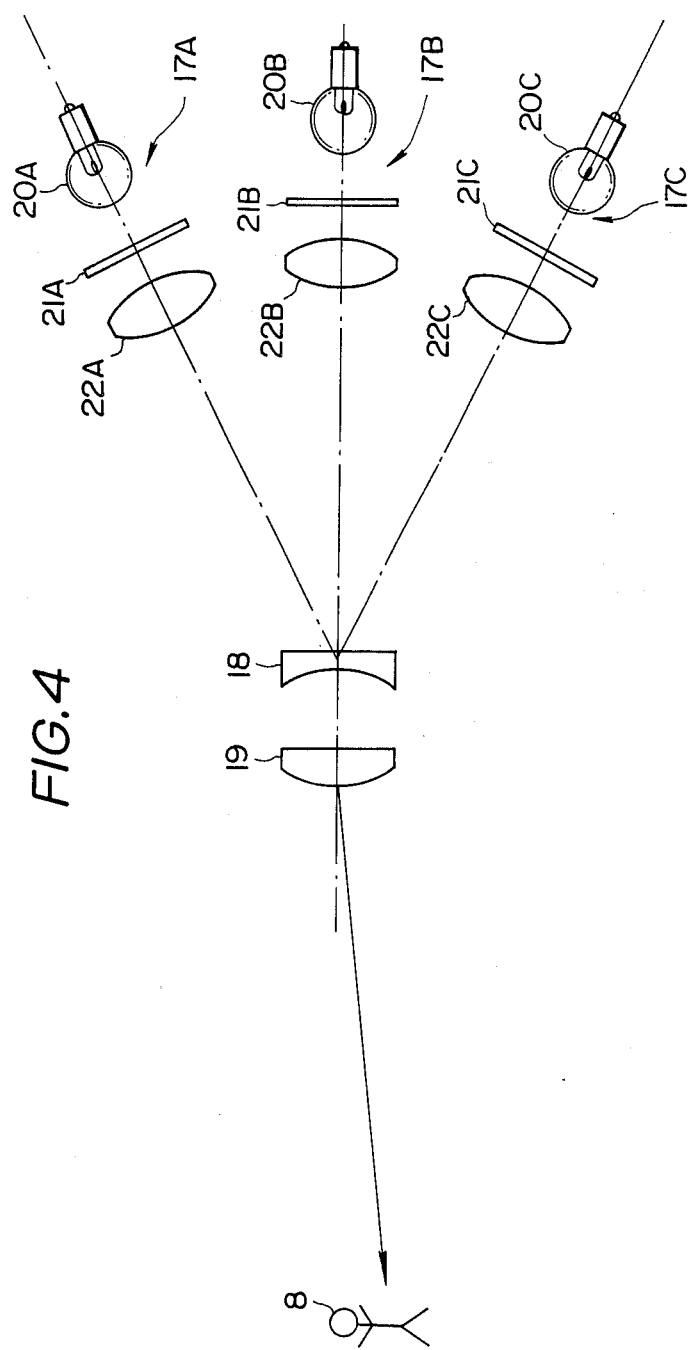
FIG. 4 is a diagram of an optical system other than the optical system composed of the headlight transmitter and the output filter shown in FIG. 3.

The preferred embodiments of this invention will be described below with reference to FIGS. 1 to 5.

As shown in FIG. 1, the first embodiment of a system according to this invention comprises a headlight transmitter 1A disposed at the front end of one's own vehicle 2A, an output filter 3A disposed in front of the headlight transmitter 1A and an input filter 4A disposed in front of the eyes of a driver 7 of one's own vehicle 2A.

The headlight transmitter 1A consists of an incandescent lamp, e.g. a tungsten halogen lamp. The light 5A generated by the headlight transmitter 1A includes a broad range of frequencies.

The output filter 3A is a kind of interference filter with a predetermined pass band or bands as shown in FIG. 2. The transmissive properties of the output filter 3A will be described in detail later. The output filter 3A filters out the visible light 5A to yield filtered light 6A with predetermined frequency components. The filtered light 6A directed toward and illuminating a pedestrian 8 (or other obstacles or irregularities in the road) is reflected by the pedestrian 8 and falls onto the eyes of the driver via the input filter 4A so that the driver 7 can easily recognize the pedestrian 8.

The light-emission capacity of the headlight transmitter 1A is boosted somewhat relative to conventional headlights to ensure adequate illumination throughout the driver's visual field despite the attenuation due to filtering.

The input filter 4A is a kind of interference filter with essentially the same transmission properties as the output filter 3A and is formed on or fixedly attached to the windshield glass. On the other hand, the input filter 4A may include an optical band-pass covering with a wider pass band than that of the output filter 3A. For example, the input filter 4A may be formed by vacuum-depositing a dielectric multilayer onto the windshield glass. Alternatively, the input filter 4A may be formed by vaccuum-depositing a dielectric multilayer onto a transparent film or glass.

The input filter 4A receives the filtered light 6A reflected by the pedestrian 8 or obstacle in the road and the light form the headlight transmitters 1B of a vehicle 2B in the opposite lane.

FIG. 2 is a graph illustrating the light-transmissive properties of the output filter 3A. The x-axis of the graph represents the wavelength of light and the y-axis of the graph represents the light-transmissivity. The solid curve 9 represents the spectral transmissivity of the output filter 3A. The curve 9 reflects three predetermined pass bands 10, 11 and 12 of the output filter 3A wherein the spectral transmissivities of the output filter 3A exhibit a peak value of about 87%. The spectral transmissivity of the output filter 3A outside of these bands is negligible, thus forming cut-off bands 10A, 10B, 11A and 12A. Accordingly, the filtered light 6A consists of only the filtered frequency components falling within the pass bands 10, 11 and 12. The pass bands 10, 11 and 12 are preferably selected so as to yield white light after filtering.

As shown in FIG. 1, since the automotive vehicle 2B in the opposite lane has no output filter in front of the headlight transmitter 1B, the unfiltered light 5B generated by the headlight transmitter 1B falls into the eyes of the driver 7 of one's own vehicle 2A solely via the input filter 4A. The input filter 4A reduces the intensity of the unfiltered light 5B and thus protects the driver 7 from being dazzled by the unfiltered light 5B. If the automotive vehicle 2A did not have the input filter, the unfiltered light 5B could dazzle the driver 7.

FIG. 3 illustrates another embodiment of this invention. The same or similar numerals as in FIG. 1 designate similar elements. The system shown in FIG. 3 differs from the system shown in FIG. 1 in that an automotive vehicle 2B in the opposite lane also has a similar system for improving the visibility of objects within the visual field. In particular, the automotive vehicle 2B has a headlight transmitter 1B similar to the headlight transmitter 1A, an output filter 3B similar to the output filter 3A, and an input filter 4B similar to the input filter 4A. Accordingly, the automotive vehicle 2B in the opposite lane will shine filtered light 6B at the first automotive vehicle 2A.

In addition, in order to increase the effect of the system shown in FIG. 3, it is necessary for the light-transmissive properties of the output filter 3B and the input filter 4B of the automotive vehicle 2B in the opposite lane to differ from those of the output filter 3A and the input filter 4A of one's own automotive vehicle 2A.

The output filter 3B and the input filter 4B possess the spectral transmissivity represented by the broken curve 13 of FIG. 2. The overall configuration of the curve 13 is the same as that of the curve 9 but the pass bands 14, 15 and 16 of the curve 13, which are preferably selected to yield white light in combination, substantially overlap the cut-off bands 10A, 11A and 12A of the curve 9.

Thus, the filtered light 6B from the automotive vehicle 2B in the opposite lane consists only of frequency components corresponding to the cut-off bands, 10A, 11A and 12A of the input filter 4A of one's own vehicle 2A and is therefore highly attenuated by the input filter 4A of ones own automotive vehicle 2A.

Similarly, the filtered light 6A from one's own vehicle 2A consists only of frequency components corresponding to the cut-off bands 14B, 15B and 16B of the automotive vehicle 2B in the opposite lane and is attenuated by the input filter 4B of the automotive vehicle 2B in the opposite lane.

In another embodiment of this invention, the output filter 3A or 3B and the input filter 4A or 4B possess only one pass band, e.g. the central pass band 11 shown in FIG. 2.

In still another embodiment of this invention, the output filter 3A and the input filter 4A employ only one pass band, e.g. the pass band, 11, and on the other hand the output filter 3B and the input filter 4B employ only one pass band, e.g. the pass band, 15, falling outside of the pass band of the output filter 3A and the input filter 4A.

The above output filter 3A or 3B may be formed by means of vacuum-depositing a dielectric multilayer onto glass or an optical lens.

FIG. 4 illustrates the optical system used in place of the optical system consisting of the headlight transmitter 1A or 1B and the output filter 3A or 3B as described above. This optical system comprises three monochromatic light transmitters 17A, 17B and 17C, one condenser lens 18 and one diffusive lens 19.

The monochromatic light transmitter 17A comprises a light source 20A, a monochromatic light filter 21A and a condenser lens 22A. As before, the light source 20A is a tungsten halogen lamp or other incandenscent lamp and transmits an extensive range of optical frequencies. The monochromatic light filter 21A filters the light transmitted by the light source 20A in accordance with its pass band 23A shown in FIG. 5 to yield essentially monochromatic light. The condenser lens 22A directs the monochromatic light transmitted through the monochromatic light filter 21A to the condenser lens 18.

The respective monochromatic light transmitters 17B and 17C have the same light sources 20B and 20C and condenser lenses 22B and 22C as the monochromatic light transmitter 17A. Monochromatic light filters 21B and 21C are similar to the monochromatic light filter 21A, but the pass bands 23A, 23B and 23C differ from one another and are very narrow, as shown in FIG. 5. The spectral transmissivities of the monochromatic light filters 21A, 21B and 21C are all about 70%. The optical axes of all the monochromatic light transmitters 17A, 17B and 17C are directed toward the center of the condenser lens 18.

The condenser lens 18 receives three monochromatic beams from the respective monochromatic light transmitters 17A, 17B and 17C and transmits the composite beam of light to the diffusive lens 19 which is arranged coaxially with the condenser lens 18. The light transmitted through the diffusive lens 19 is cast forward as a headlight beam into the visual field of the driver. The pass bands 23A, 23B and 23C are preferably selected so as to yield white light when combined by the condenser lens 18.

Alternatively, the monochromatic light transmitters 17A, 17B and 17C may be lasers generating three laser beams at different wavelengths. Alternatively, the monochromatic light transmitters 17A, 17B and 17C may be sodium-vapor lamps generating three light beams at different wavelengths. Lasers or sodium-vapor lamps can produce relatively tight light beams, which would reduce the number of convergent lenses and monochromatic filters needed in the optical system.

What is claimed is:

1. A system for improving the visibility of objects within a visual field of a driver of a vehicle, comprising:

a first optical filter with pass bands in a visible light range, said first optical filter being disposed in front of the eyes of the driver; and means for transmitting a mixture of frequency components of a light in the visible light range toward the objects, each frequency component having a predetermined central wavelength, said transmitting means including a vehicle headlight transmitter having an incandescent lamp and a second optical filter disposed in front of the headlight transmitter, the second optical filter allowing a transmission of the mixture of the frequency components;

wherein the pass bands of the first optical filter can pass the mixture of the frequency components; and wherein the mixture of the frequency components yields white light.

2. A system as recited in claim 1, wherein central wavelengths of the pass bands are essentially equal to respective wavelengths of the transmitted frequency components.

3. A system as recited in claim 1, wherein the first optical filter and the second optical filter have spectral transmissivities which are substantially equal to one another.

4. A system for improving the visibility of objects within a visual field of a driver of a vehicle, comprising:

a first optical filter of an interference type with pass bands in a visible light range, said first optical filter being disposed in front of the eyes of the driver; and a headlight transmitter transmitting white light consisting of a mixture of different monochromatic light frequencies in the visible light range toward the objects, said headlight transmitter including a first condenser lens and a plurality of monochromatic light transmitters, each of which directs one of the monochromatic light frequencies to the first condenser lens;

wherein the pass bands can pass the mixture of the monochromatic light frequencies.

5. A system as recited in claim 4, wherein each monochromatic light transmitter comprises an incandescent lamp, a monochromatic light filter filtering a light from the incandescent lamp to yield one of the monochromatic light frequencies, and a second condenser lens directing the one of the monochromatic light frequencies to the first condenser lens.

6. A system as recited in claim 4, wherein each monochromatic light transmitter comprises a laser yield and directing one of the monochromatic light frequencies to the first condenser lens.

7. A system as recited in claim 4, wherein each monochromatic light transmitter comprises a sodium-vapor lamp yielding and directing one of the monochromatic light frequencies to the first condenser lens.

8. A system for improving the visibility of objects within a visual field of a driver of a vehicle, comprising:

a first optical filter with pass bands in a visible light range, said first optical filter being disposed in front of the eyes of the driver; and means for transmitting a mixture of frequency components of a light in the visible light range toward the objects, each frequency component having a predetermined central wavelength, said transmitting means including a vehicle headlight transmitter having an incandescnet lamp and a second optical filter disposed in front of the headlight transmitter, said vehicle headlight transmitter including a plurality of monochromatic light transmitters respectively transmitting a selected frequency component and the second optical filter allowing a transmission of the mixture of the frequency components;

wherein the pass bands of the first optical filter can pass the mixture of the frequency components; and wherein the mixture of the frequency components yields white light.

9. A system for improving the visibility of objects within a visual field of a driver of a vehicle, comprising:

a first optical filter of an interference type with pass bands in a visible light range, said first optical filter being disposed substantially in front of the eyes of the driver; and means for transmitting a mixture of frequency components of a light in the visible light range toward the objects, each frequency component having a predetermined central wavelength, said transmitting means including a vehicle headlight transmitter having an incandescent lamp and a second optical filter of the interference type disposed in front of the headlight transmitter, the second optical filter allowing a transmission of the mixture of the frequency components;

wherein the pass bands of the first optical filter can pass the mixture of the frequency components; and wherein the mixture of the frequency components yields white light.

10. A system for improving the visibility of objects within a visual field of a driver of a vehicle, comprising:

(a) a first means for passing only a light beam having a wavelength within a desired range of wavelengths, said desired range of wavelengths including a plurality of predetermined ranges of wavelengths, said first means being arranged on a vehicle body between a seat for the driver and an object external to the vehicle; and (b) second means arranged on the vehicle body for generating and projecting a white light beam having the plurality of ranges of wavelengths included within the desired range of wavelengths toward the external object.

11. A system of improving the visibility of objects within a visual field of a driver of a vehicle, comprising:

(a) filter means for filtering predetermined characteristics of a light component, said filter means being arranged on a windshield of a vehicle; and (b) lighting means for lighting at least the area in front of the vehicle, said lighting means generating and projecting a white light beam having a plurality of ranges of wavelengths which can pass said filter means to provide brightness in the lighted area.

* * * * *